(12) United States Patent
Aoyagi et al.

(10) Patent No.: US 12,371,792 B2
(45) Date of Patent: Jul. 29, 2025

(54) LAMINATE, METAL PLATING SOLUTION, AND MANUFACTURING PROCESS OF LAMINATE

(71) Applicant: HITACHI, LTD., Tokyo (JP)

(72) Inventors: Takuya Aoyagi, Tokyo (JP); Hiroshi Kanemoto, Tokyo (JP); Tomio Iwasaki, Tokyo (JP); Toshinori Kawamura, Tokyo (JP); Hitoshi Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 176 days.

(21) Appl. No.: 17/915,409

(22) PCT Filed: Oct. 7, 2020

(86) PCT No.: PCT/JP2020/038064
§ 371 (c)(1),
(2) Date: Sep. 28, 2022

(87) PCT Pub. No.: WO2021/199468
PCT Pub. Date: Oct. 7, 2021

(65) Prior Publication Data
US 2023/0143193 A1    May 11, 2023

(30) Foreign Application Priority Data
Mar. 31, 2020    (JP) .................. 2020-061864

(51) Int. Cl.
*C23C 22/52* (2006.01)
*C23C 22/77* (2006.01)

(52) U.S. Cl.
CPC .............. *C23C 22/52* (2013.01); *C23C 22/77* (2013.01)

(58) Field of Classification Search
CPC ...................................................... C23C 22/52
See application file for complete search history.

(56) References Cited

U.S. PATENT DOCUMENTS

| 3,288,574 A | 11/1966 | Du et al. |
| 3,480,522 A | 11/1969 | Brownlow |
| (Continued) | | |

FOREIGN PATENT DOCUMENTS

| JP | 53-77840 A | 7/1978 |
| JP | S63-105990 A | 5/1988 |
| (Continued) | | |

OTHER PUBLICATIONS

Document A13 from IDS filed Sep. 28, 2022.*
(Continued)

*Primary Examiner* — Austin Murata
(74) *Attorney, Agent, or Firm* — Foley & Lardner LLP (57) ABSTRACT

The preset invention has as its object the provision of a laminate free of hexavalent chromium and excellent in corrosion resistance and wear resistance, and a manufacturing process of the laminate. To solve the above-described problems, a laminate according to the present invention includes a substrate, and a laminated film portion with metal films laminated in two or more layers. The laminate has an interface layer between each two adjacent ones of the metal films. The laminated film portion contains a first metal element as a principal component, the first metal element being at least one element of Ni, Cr, Co, and W, and a second metal element that is a metal element of smaller cohesive energy than that of the first metal element. The second metal element contained in the interface layer is at a content ratio higher than that of the second metal element contained in each of the adjacent metal films.

12 Claims, 7 Drawing Sheets

(56) References Cited

U.S. PATENT DOCUMENTS

| | | | | |
|---|---|---|---|---|
| 5,171,417 A | * | 12/1992 | DiFranco | C25D 1/04 |
| | | | | 205/77 |
| 2004/0211672 A1 | | 10/2004 | Ishigami et al. | |
| 2006/0123985 A1 | * | 6/2006 | Ishigami | C25D 5/10 |
| | | | | 428/617 |
| 2012/0118745 A1 | * | 5/2012 | Bao | C25D 17/10 |
| | | | | 205/67 |
| 2016/0024663 A1 | * | 1/2016 | Lomasney | C25D 5/10 |
| | | | | 205/177 |
| 2017/0114470 A1 | | 4/2017 | Nagao et al. | |
| 2018/0264782 A1 | * | 9/2018 | Kanemoto | C23C 28/023 |
| 2019/0010623 A1 | | 1/2019 | Kim et al. | |
| 2020/0255965 A1 | | 8/2020 | Kawamura | |
| 2021/0158990 A1 | | 5/2021 | Kubota et al. | |

FOREIGN PATENT DOCUMENTS

| | | |
|---|---|---|
| JP | 2002-180284 A | 6/2002 |
| JP | 2002-180297 A | 6/2002 |
| JP | 2014-82350 A | 5/2014 |
| JP | 2017-196657 A | 11/2017 |
| JP | 2019-031732 A | 2/2019 |
| WO | WO 2016-178372 A1 | 11/2016 |
| WO | WO 2019-064672 A1 | 4/2019 |

OTHER PUBLICATIONS

Extended European Search Report issued in corresponding European Patent Application No. 20929210.1, dated Nov. 16, 2023 (12 pages).

International Search Report with English translation and Written Opinion in International Application No. PCT/JP2020/038064 mailed Dec. 15, 2020.

Watanabe, Tohru, "Preparation of Multi Layer Film by Plating Method," Hyomen Kagaku 14(9)565-569, 1993 with partial translation.

* cited by examiner

LAMINATE, METAL PLATING SOLUTION, AND MANUFACTURING PROCESS OF LAMINATE

TECHNICAL FIELD

The present invention relates to a laminate with a plurality of layers of films laminated on a substrate, a metal plating solution, and a manufacturing process of the laminate.

BACKGROUND ART

In a variety of equipment, there is an increasing tendency in recent years toward their use under environments severer than before. Examples include piping and pumps used in offshore wind power generation facilities and sea water desalination plants, automotive vehicles and construction equipment in areas where a great deal of snow melting agent or the like is sprinkled and salt damage is severe, and so on.

In metal parts and components employed in such equipment, degradation is prone to progress at their surfaces due to combined factors of corrosion, wear, and the like, leading to potential concerns for increased frequency of equipment maintenance and decreased equipment service life.

Under the current circumstances, surface treatment by hexavalent chromium plating excellent in corrosion resistance and wear resistance is often adopted for metal parts and components the degradation of which is prone to progress due to the above-mentioned combined factors.

Hexavalent chromium is however designated as a substance of very high environmental concern in restrictions on environment and restrictions on drainage such as the REACH regulations (Regulation concerning the Registration, Evaluation, Authorization and Restrictions of Chemicals, establishing a European Chemical Agency), and a reduction of its employment is desired worldwide. Given such a background, a variety of surface treatment techniques has been proposed as plating techniques that replace hexavalent chromium plating.

For example, Patent Document 1 discloses a multilayered Ni alloy plating film or the like, in which a plurality of Ni alloy plating films is formed on a surface of a workpiece, the Ni alloy plating films in the individual layers contain an element, which is selected from P, B, or S, at different concentrations, and as a mutual potential relation between each two adjacent Ni alloy plating films, the outer Ni alloy plating film is disposed in a relation with its inner Ni alloy plating film in such a manner that the former is baser by 30 mV or more than the latter.

Further, Patent Document 2 discloses a film laminate with a plurality of layers of sulfur-containing nickel alloy films laminated on a substrate, in which differences in Ni concentration among the individual films are within one mass %, and S-concentrated layers are arranged between the respective films. It is also disclosed that pitting corrosion is changed into a direction horizontal to the film thickness under a sacrificial corrosion protection effect of the S-concentrated layers.

PRIOR ART DOCUMENT

Patent Documents

Patent Document 1: JP S63-105990 A
Patent Document 2: WO 2019/064672 A

SUMMARY OF THE INVENTION

Problem to be Solved by the Invention

Due to an expansion of the application field of metal parts and components and increasing severity of environments, however, further improvements are desired in wear resistance, especially, sliding wear resistance, adhesive wear resistance, and the like.

The present invention therefore has as an object thereof the provision of a laminate excellent in corrosion resistance and wear resistance without use of hexavalent chromium, and a manufacturing process of the laminate.

Means for Solving the Problem

To solve the above-described problem, a laminate according to the present invention includes a substrate and a laminated film portion with metal films laminated in two or more layers. The laminate has an interface layer between each two adjacent ones of the metal films. The laminated film portion contains a first metal element as a principal component, the first metal element being at least one element of Ni, Cr, Co, and W, and a second metal element that is a metal element of smaller cohesive energy than that of the first metal element. The second metal element contained in the interface layer is at a content ratio higher than that of the second metal element contained in each of the adjacent metal films.

Advantage of the Invention

According to the present invention, a laminate that is free of hexavalent chromium and excellent in corrosion resistance and wear resistance can be provided.

MODES FOR CARRYING OUT THE INVENTION

Using the drawings, some examples of a film structure will hereinafter be described in detail as embodiments of the present invention. It is however to be noted that the present invention is not limited to the embodiments included herein and can be appropriately combined with known techniques or improved or otherwise modified based on known techniques without departing from the technical concept of the present invention.

(Laminate)

Figure 1:
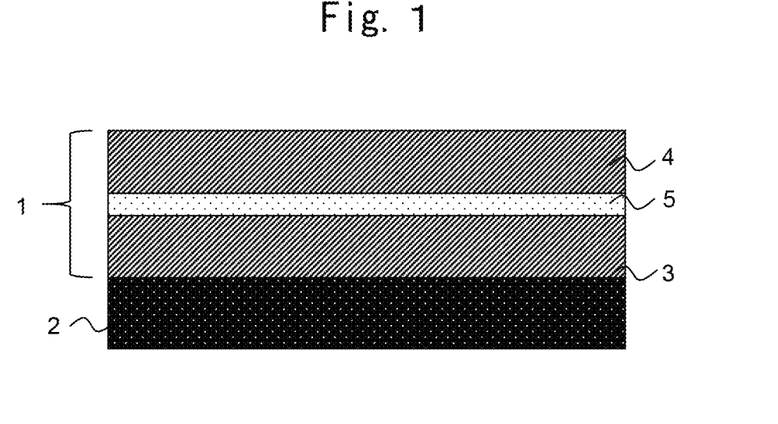
FIG. 1 is a schematic cross-sectional view illustrating an example of a laminate according to the present invention.

FIG. 1 is a schematic cross-sectional view illustrating an example of the laminate according to the present invention. As illustrated in FIG. 1, the laminate includes a laminated film portion 1 formed on a surface of a substrate 2. In this example, the laminated film portion 1 has a metal film 3 and another metal film 4 laminated in two layers.

The substrate 2 is not particularly limited, and an appropriate selection can be made depending on the use of the laminate. For example, carbon steel, low alloy steel, stainless steel, copper, aluminum, their alloys, and the like can appropriately be used. Preferably, however, a metal element of small cohesive energy may be contained in the substrate (for example, a case in which Cu or the like is contained in the substrate as will be mentioned below). This is because, if a plating process is applied to a manufacturing process of the laminate, dissolution of the metal element of small cohesive energy takes place from the substrate into a plating solution, thereby obviating any deliberate incorporation of the metal element of small cohesive energy as an additive in the plating solution. If this is the case, the metal element of small cohesive energy may be contained as a component in the substrate, or the substrate may include plural materials (for example, a thin film is formed on a stainless steel substrate). As to its contained form, no particular limitations should be imposed accordingly.

A characteristic feature of the laminate of the present invention is that, in the laminated film portion 1, an interface layer 5 is provided between the adjacent metal films 3 and 4 (in an interface region). The metal films 3 and 4 contain, as a principal component, at least one element (first metal element) of Ni, Cr, Co, and W. The content of the metal element (second metal element) of smaller cohesive energy than that of the principal component (first metal element) constituting the metal films 3 and 4 is higher in the interface layer 5 than in the adjacent metal films 3 and 4.

Now, the term "cohesive energy" means energy (cohesive energy) required to separate atoms of a substance, which exists in an aggregation state, apart from each other to infinity. The present inventors lately conducted a study using the value of energy that is required to form separated neutral atoms in their ground state from a solid at OK and 1 atm and that is published at p. 70 in Kittel, Introduction to Solid State Physics, Vol. 1, 5th ed., Maruzen Co., Ltd., 1978 (Reference 1). Lattice constants (nearest-neighbor distances) and the like are also published in ibid. p. 28.

The metal films 3 and 4 are made from metals including, as a principal component, at least one element (first metal element) selected from Ni, Cr, Co, and W which metals are employed for wear-resistant surface treatment. Here, the term "principal component" indicates a content of 50 at % or higher, and those prepared using harmful hexavalent chromium as Cr should be excluded. Illustrative are single metals such as Ni, Cr, Co, and W and alloys such as Ni—Cr, Ni—Co, Ni—W, Cr—W, and Co—W. From viewpoints of wear resistance and corrosion resistance, it is desired to contain Ni. More desirably, the concentration of Ni is 90 at % or higher. Further, the metal element of small cohesive energy contained in the metal films 3 and 4 is preferably at 1 at % or less. These settings can improve wear resistance alone without impairment to the characteristics of the whole laminated film portion 1.

The Ni-based metal films 3 and 4 are preferably crystalline. Further addition of P or/and B to increase the hardness makes the crystallite size of Ni finer, so that the metal films can be made hard and highly resistant to wear. A smaller crystallite size can facilitate hardening and therefore is preferred. More specifically, as calculated by X-ray diffraction measurement, an average crystallite size is preferably set at 4 nm or greater but 10 nm or smaller, more preferably, 6 nm or greater but 8 nm or smaller. These components are preferably contained at 3 at % or higher based on Ni from a viewpoint of high hardening, although their contents can appropriately be adjusted according to the characteristics required for the laminate.

For the purpose of similarly achieving hardening, the metal films 3 and 4 may also be composite metal films that contain particles of an oxide (for example, $TiO_2$ or $Al_2O_3$) or particles of a carbide (SiC, diamond, $B_4C$, WC, or $Cr_3C_2$). In addition, for the purpose of increasing lubricity, the metal films 3 and 4 may also be composite metal films that contain particles of, for example, BN, TiN, $MoS_2$, ZnF, graphite, or the like.

For the purpose of forming smooth surfaces, the Ni-based metal films 3 and 4 preferably contain S at 1 at % or less. As S is selectively adsorbed on a (111) surface of Ni when the metal films are formed by plating, an orientation plane can be set in a (100) orientation. The inclusion of S therefore can reduce an internal stress of the metal films 3 and 4 and can be expected to suppress occurrence of cracks and to improve the wear resistance.

Thicknesses of the metal films 3 and 4 are each preferably set at 4 nm or greater but 1000 nm or smaller, more preferably, 8 nm or greater but 500 nm or smaller. If smaller than 4 nm, the thickness of each layer is equal to or smaller than the average crystallite size, affects the overall characteristics as the laminated film portion 1 in principle, and hence is not preferred. If greater than 1000 nm, on the other hand, the effect that improves the wear resistance is hardly produced. The wear resistance can therefore be improved by setting the thicknesses of the individual metal films 3 and 4 in the above-described range. Concerning the wear resistance, the smaller the thicknesses of the metal films 3 and 4, the better. A thickness of 50 nm or smaller is particularly preferred, but thin metal films lead to an increase in the number of layers to be laminated until a target film thickness is achieved, and hence to a longer manufacturing time.

Figure 2:
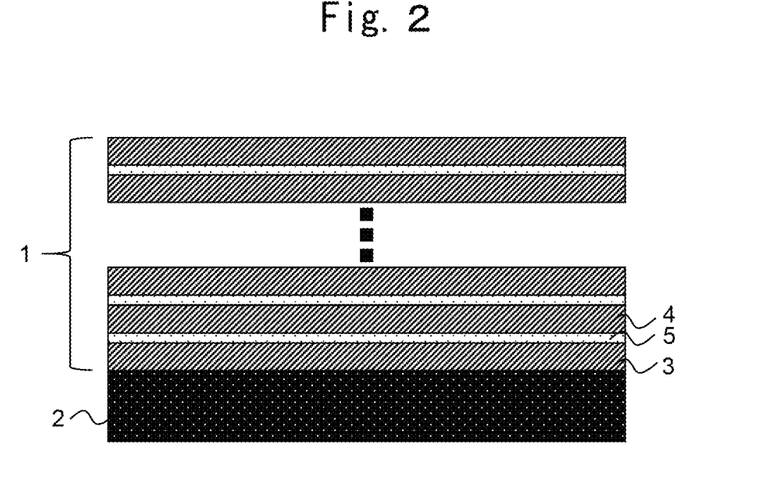
FIG. 2 is a schematic cross-sectional view illustrating another example of the laminate according to the present invention.
Figure 3:
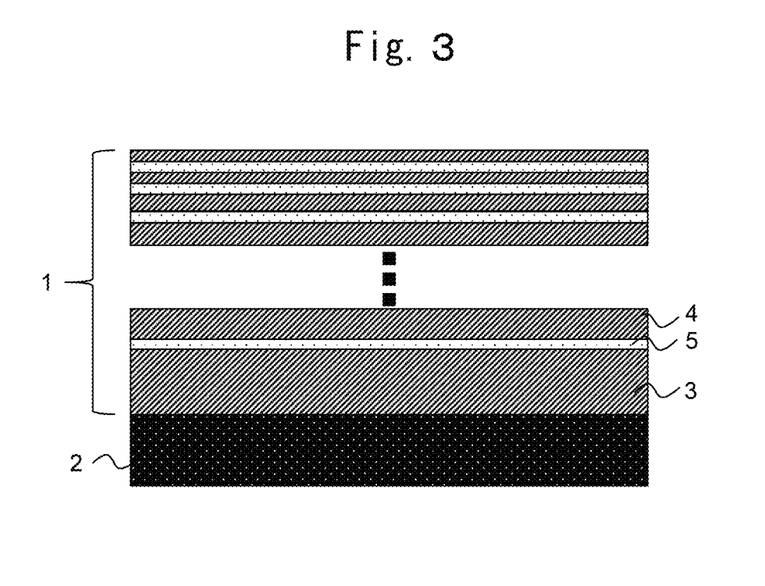
FIG. 3 is a schematic cross-sectional view illustrating a further example of the laminate according to the present invention.
Figure 4:
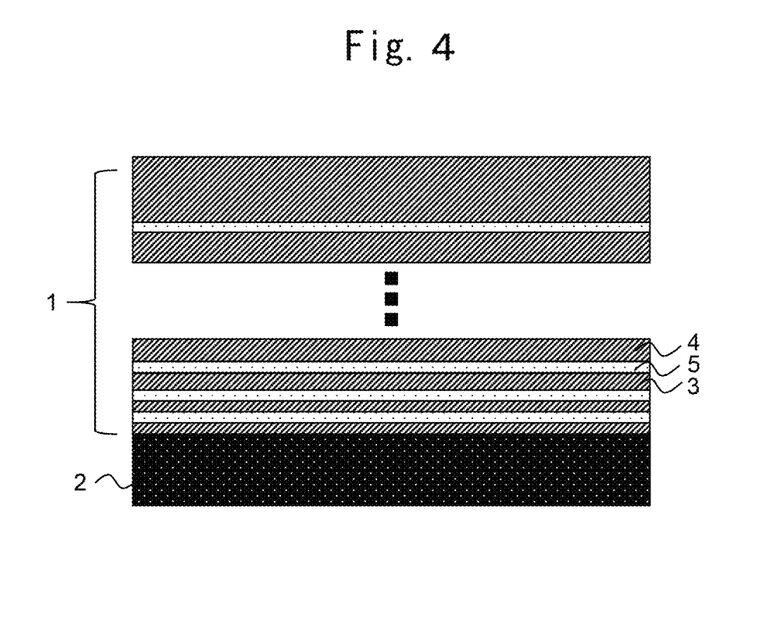
FIG. 4 is a schematic cross-sectional view illustrating a still further example of the laminate according to the present invention.

In addition, the metal films 3 and 4 may be set to have substantially the same thickness as illustrated in FIG. 2, and as an alternative, one or more thicker metal films and/or one or more thinner metal films may be appropriately included in combination. FIG. 3 illustrates an example in which the thicknesses of metal films are made smaller in a surface portion, while FIG. 4 illustrates an example in which the thicknesses of metal films are made smaller in a region near the substrate. From a viewpoint of the manufacturing process, it is desired to set the thicknesses of the individual metal films to be substantially equal as in FIG. 2.

As mentioned above, the interface layer 5 is a layer in which the metal element (second metal element) of small cohesive energy is contained more than in the metal films 3 and 4. It is basically preferred from a manufacturing viewpoint to use, as the principal component of the interface layer 5, the same component as in the metal film 3 or 4. The large content of the metal element of small cohesive energy means to make a binding force of the interface layer 5 weaker than those of the metal films 3 and 4, and the weaker interface layer 5 produces an effect that changes a propagation direction of cracks, which occur at surfaces and inside at the time of wear, into a direction perpendicular to the lamination direction of the laminate (into an in-plane direction of the interface layer). By this change in the propagation direction of the cracks, the wear rate of the laminate can be reduced, and the wear resistance is improved.

The metal element (second metal element) that has small cohesive energy and constitutes the interface layer 5 can be selected from various elements while taking into account the readiness of formation and the like in the manufacture. Among Ni, Cr, Co, and W (first metal elements) which can each be contained as a principal component in the metal films 3 and 4, the cohesive energy of Cr is the smallest, that is, 395 kJ/mol. Illustrative of metal elements smaller in cohesive energy than Cr are alkali metals, alkaline earth metals, Sc, Mn, Fe, Co, Cu, Ag, Au, Zn, Cd, Hg, Al, Ga, In, Tl, Ge, Sn, Pb, Sb, Bi, Pr, Nd, Sm, Eu, Tb, Dy, Ho, Er, Tm, and Yb.

As to how much the metal element of small cohesive energy should be used relative to the above-mentioned metal element contained as a principal component in the metal films 3 and 4, an appropriate selection can be made in accordance with design conditions such as the addition amount of the selected metal element.

For example, if it is desired to facilitate shearing in the interface layer 5 through a reduction in the binding force of the interface layer 5 by its addition in a small amount, it is desired, in addition to selection of a metal element of as small the cohesive energy as possible, to select such a metal element as producing a lattice mismatch of greater than 12% with the metal films 3 and 4. Owing to these selections, the binding force of the interface layer 5 can be made weaker by a small addition amount. In the case of the metal films 3 and 4 that contain Ni as a principal component, for example, a metal element of 2.79 Å or longer or 2.19 Å or shorter based on the values of the nearest-neighbor distances described on P. 28 in Reference 1 is pertinent as such a metal element. Illustrative are alkaline earth metals except for Be, alkali metals, Sc, Ag, Au, Cd, Hg, Al, In, Tl, Sn, Pb, Sb, Bi, Pr, Nd, Sm, Eu, Tb, Dy, Ho, Er, Tm, and Yb.

On the other hand, if addition can be made in a certain amount, for example, the binding force of the interface layer 5 is desired to be as closer to those of the metal films 3 and 4 as possible although the former must be weaker than the latter. In other words, it is desired to select a metal element that has cohesive energy slightly smaller than those of the metal films 3 and 4 and that also has a lattice mismatch of 12% or smaller with the metal films 3 and 4. In the case of the metal films 3 and 4 containing Ni as a principal component, for example, examples include Be, Mn, Fe, Co, Cu, Zn, Ga, and Ge if selected in a similar manner as mentioned above.

When the laminated film portion 1 is formed by a plating process, the metal element of small cohesive energy is desired to be an element that has a high standard electrode potential and is noble compared to the metal element contained as a principal component in the metal films 3 and 4. It is therefore facilitated to have the metal element of small cohesive energy contained more in the interface film 5 than in the metal films 3 and 4. It is also possible to decrease the amount of the additive, which is needed to form the interface layer 5, to a plating solution.

Taking the foregoing into consideration, it is desired to contain, as the metal element of small cohesive energy, a metal element selected, for example, from Cu, Sn, Zn, Ag, Mn, Bi, In, or Sb. Cu is more preferred.

In the interface layer 5, S, a metalloid element, may be further contained in addition to the metal element of small cohesive energy. The further inclusion of S not only facilitates occurrence of slippage at the interlace layer 5 upon shearing, but also hardens and smoothens the metal films 3 and 4 and improves the wear resistance of the laminated film portion 1. Further, stress can be relaxed at the interface portion, because tensile stress inside the plating films can be reduced by the S contained. Accordingly, the occurrence of cracks is suppressed, and the wear resistance is improved.

The thickness of the interface layer 5 is desired to be set at 100 nm or smaller. If the thickness is greater than this range, the characteristics of the interface layer 5, in addition to those of the metal films 3 and 4, significantly affect the characteristics of the laminated film portion 1. Such a great thickness of the interface layer 5 is therefore not preferred. The thickness of the interface layer 5 is particularly preferably 10 nm or smaller, and such a thickness can improve the wear resistance alone without substantially affecting the laminated film portion 1.

(Plating Solution for Manufacture of Laminate)

A description will be made about a plating solution for the manufacture of the laminate according to the present invention. As the manufacturing process of the present invention for the laminate (a film forming process of the laminated film portion), treatment methods such as wet treatment (for example, electroplating) and dry treatment (for example, sputtering) can each be used, but electroplating is a preferred manner from a viewpoint of mass productivity.

An electroplating solution for forming the laminated film portion 1 contains as a principal component a metal salt of at least one selected from Ni, Cr, Co, and W, and also contains a compound containing a metal element having smaller cohesive energy than these metal elements.

As the metal salt to be contained as a principal component in the plating solution for forming the metal films 3 and 4, no limitations are imposed except that hexavalent chromium is not contained, and a commonly-used salt such as a sulfides or a chloride can be used. Examples include nickel sulfate, nickel chloride, copper sulfate, copper chloride, cobalt sulfate, cobalt chloride, tungsten chloride, and the like, and they can also be used in combination.

As the metal element of small cohesive energy for forming the interface layer 5, usable examples include alkali metals, alkaline earth metals, Sc, Mn, Fe, Co, Cu, Ag, Au, Zn, Cd, Hg, Al, Ga, In, Ti, Ge, Sn, Pb, Sb, Bi, Pr, Nd, Sm, Eu, Tb, Dy, Ho, Er, Tm, and Yb.

No particular limitations are imposed on the form of the compound which contains the metal element of small cohesive energy and is to be contained in the plating solution. A metal salt, an organometal compound, or the like, which contains the metal element, can be used. Examples of the form include chlorides, sulfides, and organometal compounds.

It is to be noted that, by the addition of such a compound to the plating solution, the metal element of small cohesive energy is contained not only in the interface layer 5 but also in a trace amount in the metal films 3 and 4.

As to how much the metal element of small cohesive energy should be used relative to the above-mentioned metal element contained as a principal component in the metal films 3 and 4, the amount to be added to the plating solution can appropriately be selected in accordance with design conditions such as the content of the selected metal element in the metal films 3 and 4.

If it is desired to facilitate shearing in the interface layer 5 by reducing the binding force of the interface layer 5 through the addition in a small amount, it is desired to select such a metal element as producing a lattice mismatch of greater than 12% with the metal films 3 and 4 and add it to the plating solution, in addition to the selection of a metal element of as small the cohesive energy as possible and its addition to the plating solution. In the case of the metal films 3 and 4 containing Ni as a principal component, for example, illustrative are chlorides, sulfides, and organometal compounds containing alkaline earth metals except for Be, alkali metals, Sc, Ag, Au, Cd, Hg, Al, In, Tl, Sn, Pb, Sb, Bi, Pr, Nd, Sm, Eu, Tb, Dy, Ho, Er, Tm, and Yb.

On the other hand, if a certain amount can be introduced as an addition amount, for example, the binding force of the interface layer 5 is desired to be as close to those of the metal films 3 and 4 as possible although the former must be weaker than the latter. In other words, it is desired to select a metal element that has cohesive energy slightly smaller than those of the metal films 3 and 4 and that also has a lattice mismatch of 12% or smaller with the metal films 3 and 4, and to add the selected metal element to the plating solution. In the case of the metal films 3 and 4 containing Ni as a principal component, for example, it is preferred to add a chloride, sulfite, or organometal compound that contains Be, Mn, Fe, Co, Cu, Zn, Ga, or Ge.

If the laminate of the invention of this application is formed by a plating process, the amounts of components can appropriately be adjusted because the amounts added to a plating solution do not turn out in their entirety to form the metal films 3 and 4 and the interface layer 5. If Ni is used as a principal component of plating and Cu is used as a metal element of small cohesive energy, for example, the amount of Cu to be added to the plating solution may be $3/100000$ or less of a Ni salt.

When the laminated film portion 1 is formed by a plating process, the metal element of small cohesive energy is desirably nobler than the metal element contained as a principal component in the metal films 3 and 4. Taking this into consideration, the metal element of small cohesive energy is desirably selected, for example, from Cu, Sn, Zn, Mn, Bi, and In if the principal component of the plating is Ni. Cu is more preferred.

In the plating solution, a reducing agent, a complexing agent, a pH modifier, a supporting salt, and other additives can also be contained as general plating components. If the principal component of the metal films 3 and 4 is Ni, for example, P or/and B components may desirably be contained in the metal films to increase the hardness. In this case, for example, phosphonic acid as a phosphorus compound, boric acid as a boron compound, or the like can be used and contained as a principal component.

For the purpose of similarly achieving hardening with use of an additive, it is also possible to have particles of an oxide (for example, $TiO_2$ or $Al_2O_3$) or particles of a carbide (SiC, diamond, $B_4C$, WC, or $Cr_3C_2$) contained and dispersed in the plating solution. In addition, for the purpose of increasing lubricity, particles of BN, TiN, $MoS_2$, ZnF, graphite, or the like can also be similarly contained and dispersed in the plating solution.

For the purpose of improving slippage of the interface layer 5 upon shearing and for the purpose of hardening and smoothening the metal films 3 and 4, it is desired to contain a sulfur-containing organic compound, which contains sulfur as a metalloid element, in addition to the metal element of small cohesive energy, in the plating solution. As the sulfur-containing organic compound, a known gloss agent such as saccharin, sodium laurylsulfate, allylsulfonic acid, or thiourea can be used. These additives are prone to adsorption on the surfaces of the metal films 3 and 4, so that the interface layer 5 can readily be formed.

It is to be noted that the concentrations of various components in the electroplating solution can adequately be adjusted.

(Manufacturing Process of Laminate)

A description will be made about the manufacturing process according to the present invention for the laminate. As mentioned above, treatment methods such as wet treatment (for example, electroplating) and dry treatment (for example, sputtering) can each be used as the manufacturing process of the present invention for the laminate (the film forming process of the laminated film portion), but electroplating is a preferred manner from the viewpoint of mass productivity. Accordingly, a description will hereinafter be made about a process of manufacturing the laminate by electroplating.

An electroplating process as an example of the manufacturing process according to the present invention for the laminate will be presented hereinafter.

1. Plating treatment step of the metal film 3
2. Treatment step for forming the interface layer 5
3. Plating treatment step of the metal film 4
4. Rinsing step
5. Drying step
6. Annealing treatment step The description has been made about the laminated film portion 1 in which the two layers of the metal films 3 and 4 are laminated. However, the number of layers of the metal films can appropriately be set according to the specifications of corrosion resistance, wear resistance, service life, and the like required for each part, component, or product to which the laminate is applied. The above-described steps 1 to 3 should therefore be performed repeatedly according to the numbers of the layers of the metal films 3 and 4 in the laminated film portion 1.

To produce excellent wear resistance at the laminated film portion 1 of the laminate of the present invention, the step 2 for forming the interface layer 5 and the annealing treatment step 6 are important in the above-described process.

The step for forming the interface layer 5 can appropriately be selected insofar as an interface layer can be formed under conditions different from those for the plating treatment. For example, by adding a compound (interface layer precursor substance), which adsorbs on the metal films, to the plating solution under plating treatment stop conditions, the stop time of the plating treatment can be used for the step for forming the interface layer 5. Specifically, by setting a sufficient stop time of the plating treatment (for example, 30 seconds or longer) with the substrate kept immersed in the plating solution, the precursor substance that will form the interface layer 5 adsorbs on the surface of the metal film 3, and the interface layer 5 can then be formed concurrently with the plating treatment step 3 of the metal film 4. It is also a characteristic feature that no rinsing is carried out between the stop after the plating treatment, which is the formation treatment of the interface layer 5, and the plating treatment step of the metal film 4. If rinsing were carried out, the substance adsorbed on the surface to form the interface layer 5 would flow off, and therefore, it would be unable to form the interface layer 5.

In the annealing treatment step, the annealing temperature is preferably set at 300° C. or lower. This is a finding obtained from the results of the diligent study by the present inventors. The setting of the annealing temperature at 300° C. or lower enables control of the average crystallite size of a nickel alloy film at 8 nm or smaller. An annealing temperature of higher than 300° C. is prone to make the crystallite of the nickel alloy film coarse, so that the hardness of the laminated film portion 1 is reduced. The annealing treatment time is not particularly limited but may preferably be, for example, one hour or longer.

It is to be noted that, as electrolysis conditions for the plating treatment step 1 of the metal film 3 and the plating treatment step 3 of the metal film 4, the current density and the treatment time may appropriately be adjusted according to the desired film thickness, and from a viewpoint of making equal the thickness of each film, are preferably set under the same conditions.

Impurity removal steps such as degreasing and pickling may also be performed as pretreatments for the substrate 2 before the plating treatment step 1 of the metal film 3 as needed. Further, an adhesive layer forming step (for example, strike plating or the like) may also be performed to improve the adhesiveness of the laminated film portion 1.

As described above, the manufacturing process of the present invention for the laminate forms a plurality of layers of metal films under the same electrolysis conditions by using a single plating bath, and therefore has an advantage that it is simple and convenient and is high in productivity (in other words, is low in cost).

In the present invention, the shape of the substrate 2 (in other words, the shape of the laminate) is not particularly limited, and the laminate can be applied to a part or component of any shape (for example, block, flat plate, curved plate, cylinder, prism). If the films are formed by electroplating, however, the film thickness may vary with the place due to the effect of a current distribution depending on the shape of the part or component (the shape of the substrate 2). It is therefore preferred to measure the effect of a current distribution beforehand through an analysis and an actual measurement, and to perform electroplating under conditions that allow suppression of plating place-dependent variations in film thickness, by arranging a shielding plate or the like between the workpiece and a counter electrode as needed, for example.

A detailed description will hereinafter be made using Examples. However, the present invention is not limited to the description of the Examples included herein, and the Examples may be combined appropriately.

(Molecular Dynamics Simulations of Interface Models)

Example 1, Comparative Example 1

To demonstrate advantageous effects of the present invention, molecular dynamics simulations were performed on structure models, and deformation behaviors of laminated film portions due to correlations in cohesive energy were evaluated. In this Example, a study was conducted using a method such as that disclosed, for example, in R. Car and M. Parrinello, Phys. Rev. Lett., 50, 2471. (1985) (Reference 2). As illustrated in FIG. 5 to FIG. 8, a shear force was applied to metal films 3 and 4 of laminates, in each of which the kind of the metal films was changed, and the resulting destruction sites and deformations were studied. Concerning stress, a method that calculates a stress from the virial equation by using molecular dynamics is published, for example, in S. C. Chowdhury, B. Z. G. Haque and J. W. Gilespie, J. Mater. Sci., 51, 10139 (Reference 3). The present inventors calculated each stress from the virial equation by using a molecular dynamics simulation as descried in Eq. (1) in Reference 3.

Figure 5:
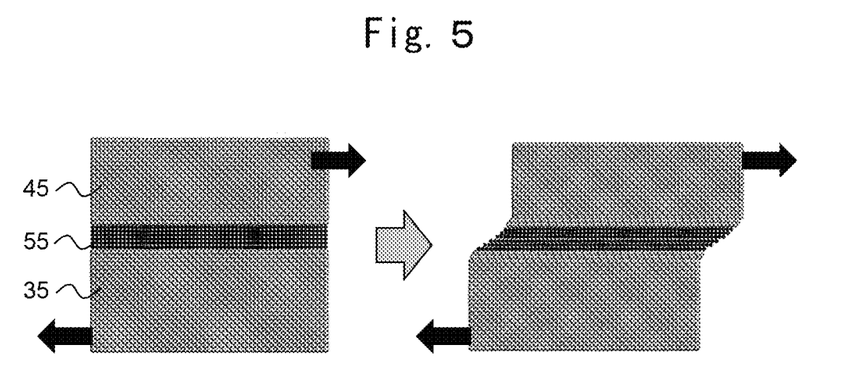
FIG. 5 is a molecular dynamics simulation according to an embodiment of the present invention.

In Example 1, Ni (cohesive energy: 428 kJ/mol) was selected for metal films 35 and 45, Cu (cohesive energy: 336 kJ/mol) was selected as a metal element of small cohesive energy for an interface layer 55, and a structure model as illustrated in FIG. 5 was created. To that structure model, a shear that would act at the time of a wear test was applied at a deformation rate of 10 m/s.

As a result, it was found that the Cu layer and the interface portions between Cu and Ni underwent slip deformation and an internal break was suppressed. This is considered to be attributable to the occurrence of substantially no tensile deformation in the metal films 35 and 45 and the occurrence of a shear in the interface layer 55 because, upon shearing, the shear stress (168 MPa) at which a shear occurred in the interface layer 55 was greater than the tensile stress (98.7 MPa) inside the Ni layers that form the metal films 35 and 45. It is therefore inferred that, at the time of a wear test, cracks do not propagate inside but a shear and cracks propagate along the interface layer 55 if a metal element of small cohesive energy exists in the interface layer 55.

Figure 6:
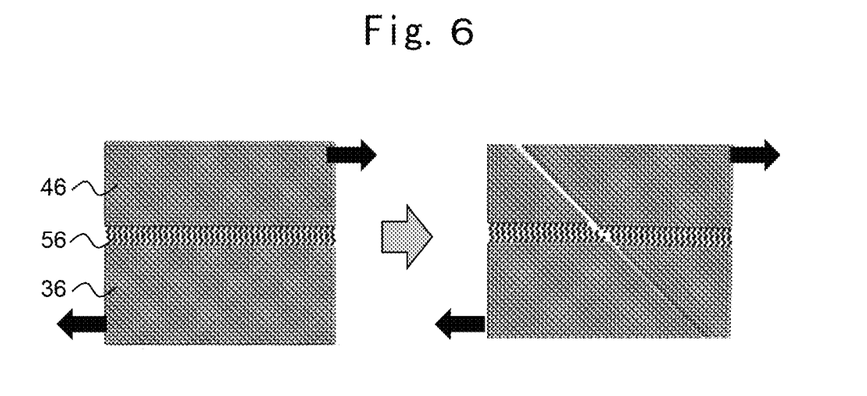
FIG. 6 is a molecular dynamics simulation according to a comparative embodiment of the present invention.

On the other hand, Comparative Example 1 is presented in FIG. 6. In Comparative Example 1, Ni was selected for metal films 36 and 46 as in Example 1, and W (cohesive energy: 859 kJ/mol), which is a metal element greater in cohesive energy than Ni, was selected for an interface layer 56. Similarly to Example 1, a structure model as illustrated in FIG. 6 was created. To the structure model, a shear was similarly applied at a deformation rate of 10 m/s.

As a result, it was found that cracks occurred in the metal film 36 made from Ni, and the cracks so occurred then ran through the interface layer 56 and propagated into the metal film 46. This is considered to be a result of preferential occurrence of an internal break rather than shear deformation, because the tensile stress (216 MPa) occurred inside the Ni layers as the metal films 36 and 46 upon shearing was greater than the shear stress (187 MPa) at the interfaces. It has therefore been found that, with the interface layer 56 using the metal element of large cohesive energy, no improvement can be expected in wear resistance because cracks run through the interface layer 56 and propagate into the metal film at the time of a wear test.

From the above results, it has been realized that, when a metal element of smaller cohesive energy than those of the adjacent metal films 3 and 4 exists in the interface layer 5, internal propagation of cracks is suppressed at the time of a wear test on the metal films, and the wear resistance is improved.

It is to be noted that, in the case of a film (Comparative Example 2) of a similar thickness as in Example 1 and Comparative Example 1 without the interface layer 5, similar results as in Comparative Example 1 are inferred to be obtained as the shearable interface layer 5 does not exist, although no calculation was made.

In Example 1, Cu was selected as a metal element of small cohesive energy for use in the interface layer 5. In addition, a study was also conducted on other examples of the interface layer 5, from which similar effects are obtained. When a metal element other than Cu exists, a similar phenomenon is considered to occur in principle if the cohesive energy of the interface layer 5 is smaller than those of the metal films 3 and 4.

Therefore, the metal element that exists in the interface layer 5 is by no means limited to Cu, and no restrictions are imposed whatsoever insofar as metal elements of small cohesive energy are concerned. The results of this study are hence considered to be also realized with metal elements other than Cu, for example, with metal elements such as alkali metals, alkaline earth metals, Sc, Mn, Fe, Co, Ag, Au, Zn, Cd, Hg, Al, Ga, In, Tl, Ge, Sn, Pb, Sb, Bi, Pr, Nd, Sm, Eu, Tb, Dy, Ho, Er, Tm, and Yb.

Example 2

In Example 1 and Comparative Example 1, the simple metal was studied as a metal element to be applied to the interface layer 5. As Example 2, a further study was conducted on a case in which a plurality of elements existed in combination in the interface layer 5.

Figure 7:
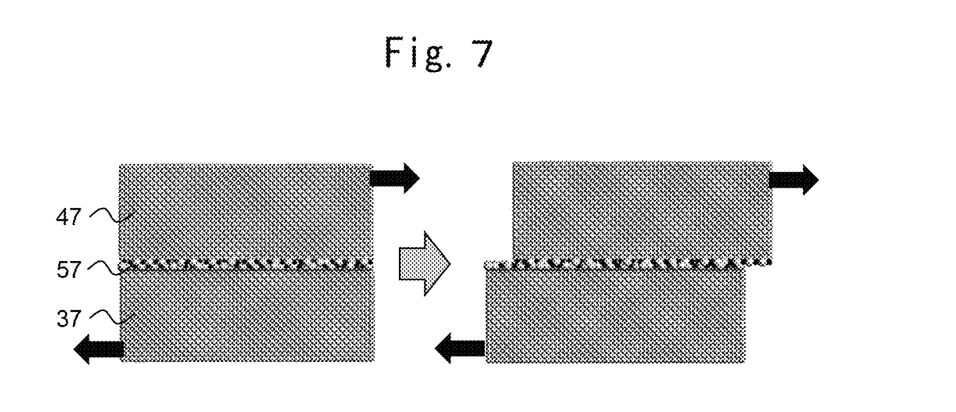
FIG. 7 is a molecular dynamics simulation according to another embodiment of the present invention.

As illustrated in FIG. 7, a structure model was created in which Ni was selected for metal films 37 and 47 as in Example 1, and S (cohesive energy: 275 kJ/mol), a metalloid element, additionally existed in an interface layer 57 in combination with Cu, a metal element of small cohesive energy. Here, S is selected because S is such an element that, in addition to its small cohesive energy, when a plating process is assumed, an S-containing compound is widely used as a gloss agent in general and is easy to introduce into a plating solution and plating films, and there is a possibility that it becomes essential to add such an S-containing compound in a viewpoint other than wear resistance.

When a shear was applied as in Example 1, it was found that, as illustrated in the right diagram of FIG. 7, slip deformation occurred in the interface layer 57 and an internal break was suppressed. This is considered to be attributable to the occurrence of substantially no tensile deformation in the metal films 37 and 47 and the occurrence of a shear in the interface layer 57, because upon shearing, the shear stress (172 MPa) at which the shear occurred in the interface layer 57 was greater than the tensile stress (57.3 MPa) inside the Ni layers, the metal films 37 and 47.

It has therefore been found that, even when S, a metalloid element, exists in combination in addition to a metal element of small cohesive energy, similar advantageous effects are available.

Example 3

Figure 8:
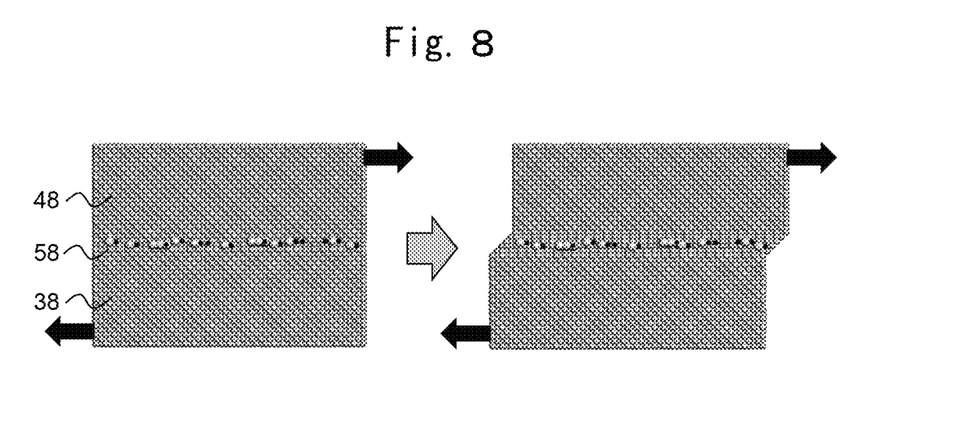
FIG. 8 is a molecular dynamics simulation according to a further embodiment of the present invention.

In Example 3, a structure model of FIG. 8 was created in which Ni was selected for metal films 38 and 48 as in Example 1, and Cu and S of small cohesive energy additionally existed in an interface layer 58 in combination with Ni, the same metal element as that in the metal films 38 and 48. When a shear was applied as in Example 1, it was found that, as illustrated in FIG. 8, slip deformation occurred and an internal break was suppressed. This is considered to be attributable to the occurrence of substantially no tensile deformation in the metal films 38 and 48 and the occurrence of a shear in the interface layer 58, because upon shearing, the shear stress (155 MPa) at which the shear occurred in the interface layer 58 was greater than the tensile stress (116 MPa) inside the Ni layers, the metal films 38 and 48.

It has hence been realized that the element, which makes up the interface layer 5, is not needed to consist of only an element completely different from that of the metal films 3 and 4 as presented in Examples 1 and 2, and similar advantageous effects are available if an element of small cohesive energy is scattered about in the layer. As appreciated from the foregoing, the formation of an interface layer having a larger shear stress than metal films can be achieved by making the content ratio of an element of small cohesive energy higher in the interface layer 5 than in the metal film 3 or 4.

(Preparation of Laminate by Plating Process)

Examples 4 to 10, Comparative Examples 2 to 4

(Manufacturing Process of Laminate)

As a substrate for forming each laminated film portion 1, SUS 303 material (50 mm×70 mm×3 mm) finished at a surface thereof to an arithmetic mean roughness Ra<0.05 μm by mechanical polishing was used. To form the metal films 3 and 4, an Ni—P electroplating solution based on Watts bath and presented in Table 1 was used. As additives for forming the interface layer 5, the compounds presented in Table 1 were added into the electroplating solution. As metal elements of small cohesive energy, Cu, Sn, Zn, Mn, Bi, and In were studied. Saccharine was used as an S source for improving wear resistance and gloss properties. As Comparative Examples, plating solutions free of an additive or additives for not forming the interface layer 5 were also prepared.

A manufacturing process of each laminate was performed following the above-mentioned flow. Specifically, impurity removal steps for degreasing and pickling were first performed as pretreatments for the substrate. Further, oxide films on the substrate were removed, and strike plating of Ni was performed to provide the resulting plating film with improved adhesiveness.

For the plating treatment steps of metal films, electroplating treatment conditions were set in such a manner that each film had a thickness of 500 nm and the number of layers was set to 20 (the overall thickness of plating layers was 10 μm). As electrolysis conditions for the plating treatment steps, the plating treatment was conducted at a constant current by using an Ni plate as a counter electrode. In a treatment step for forming the interface layer 5, the formation was designed to be performed by stopping the electrolysis, and the stop time was set to 30 seconds. Those formed with a single-layer film instead of a laminated film portion were also prepared as comparisons. On the film or films of each laminate so prepared, annealing treatment was further performed. In the annealing treatment step, the annealing temperature was set to 300° C., and the holding time was set to 2 h.

(Evaluation Method of Laminates)

Identification and crystallite size measurement of crystal phases in each laminate so prepared were performed using wide-angle X-ray diffractometry. Evaluation of wear resistance of each prepared laminate was conducted using a reciprocating sliding test machine. In the evaluation of wear resistance, after a mating material (bearing steel SUJ2; 10 mm dia.) was reciprocally slid over 0.04 m under a load of 9.8 N and at a rate of 0.1 m/s under non-lubrication conditions, an average value of wear marks of a specimen was measured through measurement of steps at several points. Each specimen with the film or films cracked and delaminated by the wear resistance test is indicated as "x" in Table 1, whereas each specimen with the film or films remained in a worn-down state without delamination by the wear resistance test is indicated as "○" in Table 1.

The compositions of the used plating solutions, the plural-layer/single-layer structures of the plating films, and the evaluation results of wear resistance in Examples 4 to 10 and Comparative Examples 2 to 4 are presented in Table 1.

TABLE 1

| | Raw material compound (g/L) | Comp. Ex. 2 | Comp. Ex. 3 | Comp. Ex. 4 | Ex. 4 | Ex. 5 | Ex. 6 | Ex. 7 | Ex. 8 | Ex. 9 | Ex. 10 |
|---|---|---|---|---|---|---|---|---|---|---|---|
| Basic composition of solution | Nickel sulfate hexahydrate | 262.9 | 262.9 | 262.9 | 262.9 | 262.9 | 262.9 | 262.9 | 262.9 | 262.9 | 262.9 |
| | Nickel chloride hexahydrate | 27.4 | 27.4 | 27.4 | 27.4 | 27.4 | 27.4 | 27.4 | 27.4 | 27.4 | 27.4 |
| | Phosphonic acid | 32.8 | 32.8 | 32.8 | 32.8 | 32.8 | 32.8 | 32.8 | 32.8 | 32.8 | 32.8 |
| | Trisodium citrate dihydrate | 147.05 | 147.05 | 147.05 | 147.05 | 147.05 | 147.05 | 147.05 | 147.05 | 147.05 | 147.05 |
| Additive | Saccharin | 0 | 0 | 0 | 0 | 2 | 2 | 2 | 2 | 2 | 2 |
| | Copper sulfate pentahydrate | 0 | 0 | 0.002 | 0.002 | 0.002 | 0 | 0 | 0 | 0 | 0 |
| | Tin sulfate | 0 | 0 | 0 | 0 | 0 | 0.002 | 0 | 0 | 0 | 0 |
| | Zinc sulfate heptahydrate | 0 | 0 | 0 | 0 | 0 | 0 | 0.002 | 0 | 0 | 0 |
| | Manganese sulfate | 0 | 0 | 0 | 0 | 0 | 9 | 0 | 0.002 | 0 | 0 |
| | Bismuth sulfate | 0 | 0 | 0 | 0 | 0 | 0 | 0 | 0 | 0.002 | 0 |
| | Indium sulfate | 0 | 0 | 0 | 0 | 0 | 0 | 0 | 0 | 0 | 0.002 |
| Characteristics of film structure | Layer structure of plating layer (s) | Single layer | 20 layers | Single layer | 20 layers | 20 layers | 20 layers | 20 layers | 20 layers | 20 layers | 20 layers |
| | Evaluation of wear resistance | x | x | x | ○ | ○ | ○ | ○ | ○ | ○ | ○ |

Interface layer components in the Examples, in which Cu was added, were confirmed. The component proportions in terms of at % were Cu: 0.03 at %, Ni: 93.4 at %, P: 6.5 at %, and S: 0.05 to 0.07 at %. On the other hand, the content of the Cu component in each plating solution was 2.3 mg/L in copper sulfate pentahydrate conversion.

As indicated in Comparative Examples 2 and 3 of Table 1, with the plating solutions in which none of the additives for forming the interface layer 5 existed, the metal film or films in both the single layer and the 20 layers were delaminated due to the introduction and propagation of cracks in the wear resistance tests. In Comparative Example 4 in which the interface layer 5 was not formed though Cu, a metal element of small cohesive energy, was contained, the metal film was also delaminated similarly.

In Example 4 in which the interface layers 5 were formed, on the other hand, the films were not delaminated after the wear resistance test, so that it was confirmed that the wear resistance was improved over those in Comparative Examples 2 to 4. These results are correlated with the results of the simulation in Example 1, so that, in Example 4, the wear resistance is considered to have been improved owing to suppression of internal propagation of cracks occurred in the films.

As also presented in Table 1, the wear resistance was similarly improved even in each case in which S, a gloss agent, was contained besides the metal element of small cohesive energy. It has therefore been confirmed that S may be contained.

As also presented in Table 1, improvements in wear resistance characteristics were similarly confirmed even when, as a metal element of small cohesive energy, Sn, Zn, Mn, Bi, or In was used as an additive in place of Cu. From the foregoing, it was therefore possible to obtain, also from the experiments, the results that substantiate the simulation in Example 1.

When the laminate of Example 5 was analyzed by XRD, a (200) peak also appeared besides a (111) peak of Ni and the crystallite size was 6 nm in Example 5, although in Comparative Examples 2 and 3, only the (111) peak appeared and the crystallite size was 8 nm. It has therefore been realized that the orientation plane of a laminate is desirably in (100) orientation in order to improve the wear resistance.

Figure 9:
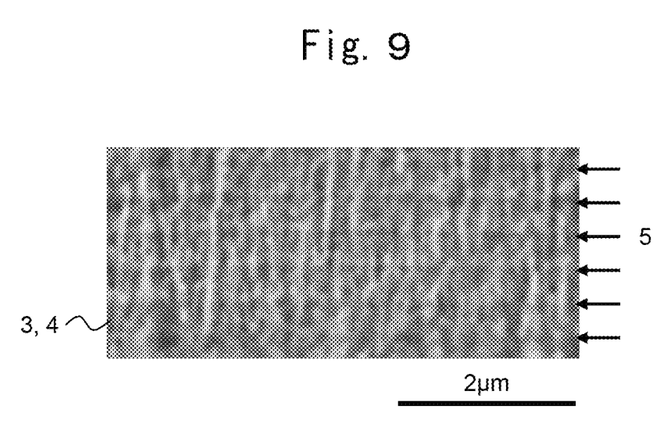
FIG. 9 is a cross-sectional SEM image according to a still further embodiment of the present invention.

FIG. 9 shows a cross-sectional SEM image of Example 5. As shown in FIG. 9, it has been confirmed that the prepared films were formed from the laminated film portion. It has also been confirmed by a SIMS analysis that more S existed locally in the interfaces of plural layers than that contained in the metal films. When the concentrations of elements contained in the films were analyzed by XRF, on the other hand, they were found as follows: Ni: 93.36, P: 6.56, S: 0.07, and Cu: 0.01 in at %.

Figure 10:
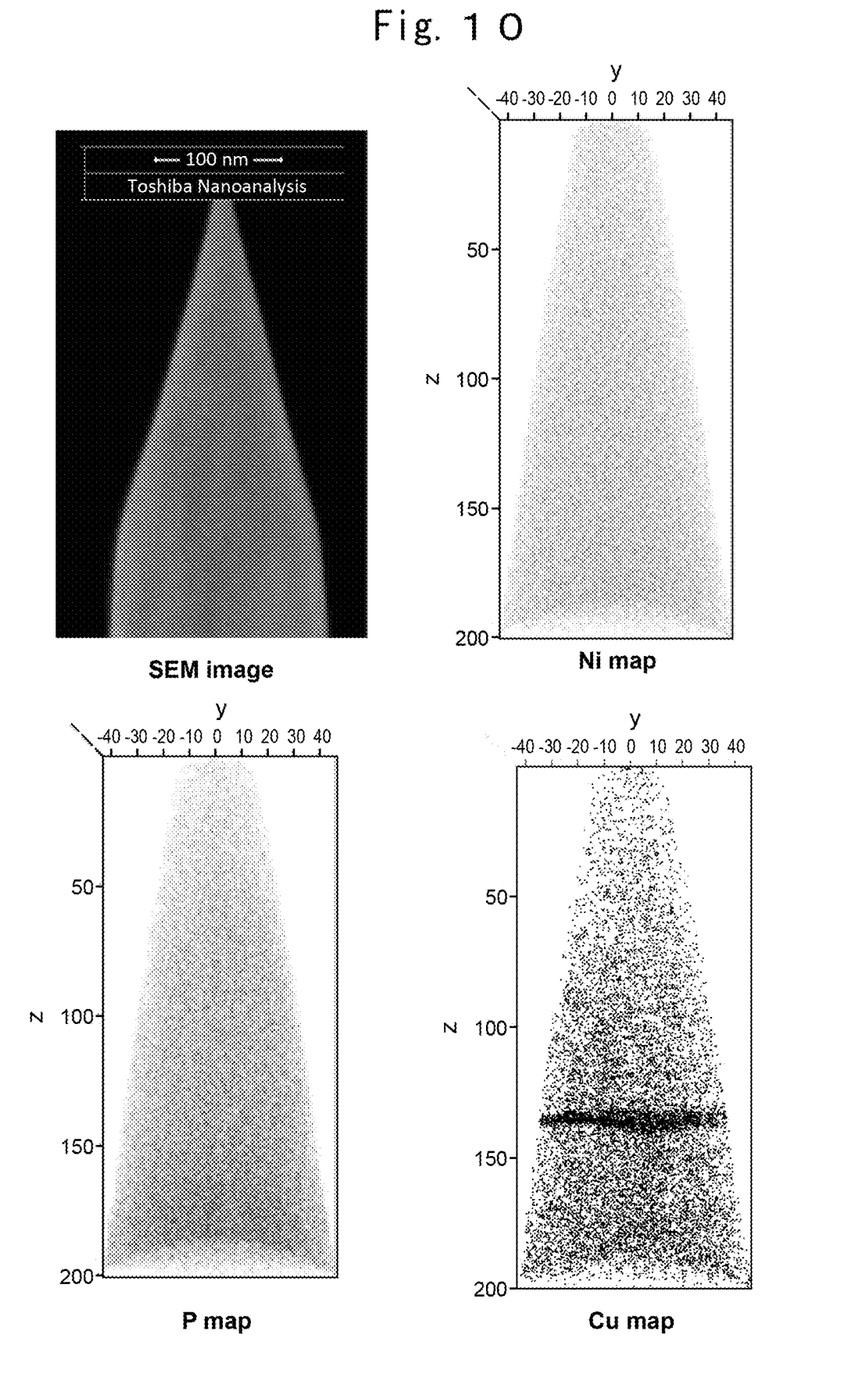
FIG. 10 shows atom maps by an atom probe according to the still further embodiment of the present invention.

FIG. 10 shows atom maps of an interface portion as analyzed by an atom probe. As shown in FIG. 10, it has been confirmed that the principal components of the interface portion were Ni and P, but Cu, a metal element of small cohesive energy, locally existed at 0.04 at % in the interface. It has also been confirmed that the interface layer existed with a thickness of 10 nm or smaller. Concerning S, on the other hand, it was unable to ascertain its distribution as its peak overlaps that of Ni.

Examples 11 to 14

In these Examples, Cu was selected as a metal element of small cohesive energy, and a study was conducted about desired addition amounts of Cu. The study was conducted by the same method as that described in Examples 4 to 10 except that the plating solution was changed.

The results of Examples 11 to 14 are presented in Table 2. Assuming that the wear resistance of Example 11, in which copper sulfate pentahydrate was added at 0.002 g/L without addition of saccharin, was 100, the respective Examples were compared in wear resistance.

TABLE 2

| | Raw material Compound (g/L) | Ex. 11 | Ex. 12 | Ex. 13 | Ex. 14 |
|---|---|---|---|---|---|
| Basic composition of solution | Nickel sulfate hexahydrate | 262.9 | 262.9 | 262.9 | 262.9 |
| | Nickel chloride hexahydrate | 27.4 | 27.4 | 27.4 | 27.4 |
| | Phosphonic acid | 32.8 | 32.8 | 32.8 | 32.8 |
| | Trisodium citrate dihydrate | 147.05 | 147.05 | 147.05 | 147.05 |
| Additive | Saccharin | 0 | 2 | 2 | 2 |
| | Copper sulfate pentahydrate | 0.002 | 0.002 | 0.01 | 0.02 |
| Characteristics of film structure | Layer structure of plating layers | 20 layers | 20 layers | 20 layers | 20 layers |
| | Evaluation of wear resistance | ○ | ○ | ○ | ○ |
| | Wear resistance (%) | 100 | 108 | 100 | 80 |

As presented in Table 2, it was found that wear resistance is impaired if, as copper sulfate pentahydrate, its concentration in a plating solution exceeds 0.02 g/L. It has therefore been realized that, if Cu is selected as a metal element of small cohesive energy, a plating solution desirably contains Cu at 0.02 g/L or lower, more desirably, 0.01 g/L or lower, as a concentration of copper sulfate pentahydrate.

Examples 15 to 18, Comparative Example 5

In these Examples, a study was conducted at varied thicknesses of the metal films 3 and 4 with use of the plating solution of Example 12. Concerning the thicknesses of the metal films, they were adjusted by the electrolysis time in such a manner that the thicknesses presented in Table 3 were achieved. The other conditions were the same as in Examples 4 to 10.

The results of Examples 15 to 18, in which the thicknesses of the metal films were adjusted, and those of Comparative Example 5, in which no treatment step was performed for the formation of the interface layers 5, are presented in Table 3.

TABLE 3

| | Comp. Ex. 5 | Ex. 15 | Ex. 16 | Ex. 17 | Ex. 18 |
|---|---|---|---|---|---|
| Thickness of each layer (nm) | 10000 | 500 | 250 | 100 | 50 |
| Layer structure of plating film (s) | Single layer | 20 layers | 40 layers | 100 layers | 200 layers |
| Wear resistance (%) | 100 | 105 | 114 | 123 | 131 |

As presented in Table 3, it has been found that wear resistance is improved as the thickness of each layer is made smaller.

Figure 11:
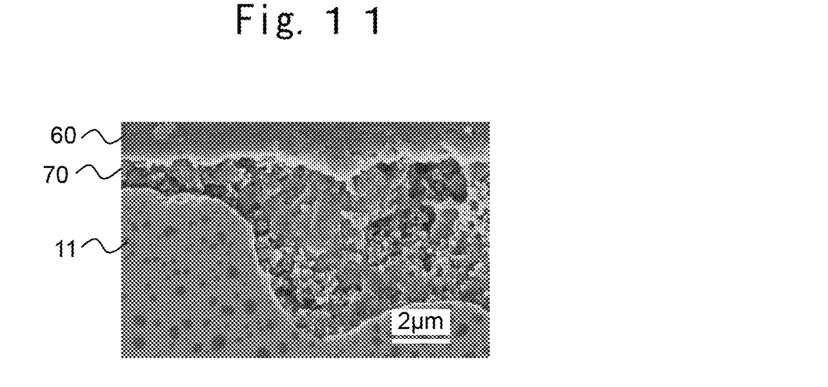
FIG. 11 is a cross-sectional SEM image after a wear resistance test according to another comparative embodiment of the present invention.
Figure 12:
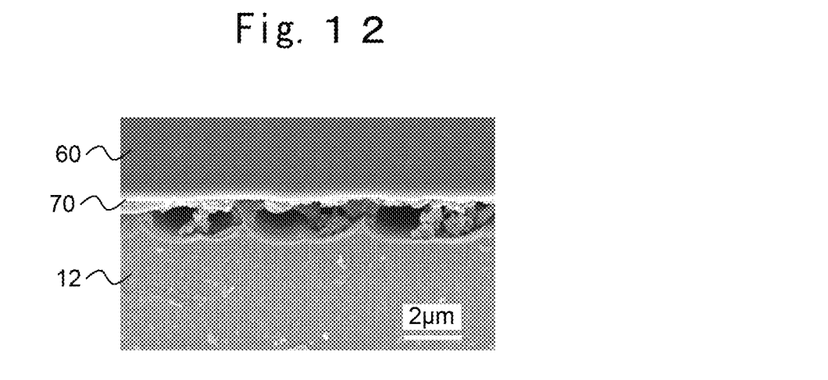
FIG. 12 is a cross-sectional SEM image after a wear resistance test according to a yet further embodiment of the present invention.

After wear resistance tests in Comparative Example 5 and Example 15, test pieces were each embedded in a resin, sliced, and observed at a cross-section. The respective cross-sectional SEM images are shown in FIG. 11 and FIG. 12.

As shown in these figures, it is realized that the worn-down state of a surface after the wear resistance test is different between Example 15, which had a laminated film portion 12 with the interface layers 5 abundantly containing the metal element of small cohesive energy, and Comparative Example 5, which had a single-layer film 11 free of any interface layer 5. As a result of observations of points where surface delamination occurred, it has been found that, in Example 15 (FIG. 12), a delaminated portion extended evenly and horizontally relative to a sliding surface 70, and cracks did not propagate much into the laminated film portion 12. These results therefore substantiate Example 1. It has therefore been confirmed that wear resistance is improved by suppression of internal propagation of cracks owing to the existence of interface layers. In Comparative Example 5 (FIG. 11), on the other hand, a delaminated portion extended depthwise in a downward direction to a depth relative to a sliding surface 70, and internal propagation of the delamination in the single-layer film 11 tended to spread.

DESCRIPTION OF REFERENCE CHARACTERS

1 . . . Laminated film portion
2 . . . Substrate
3, 4 . . . Metal Film
5 . . . Interface layer
35, 45 . . . Ni, 55 . . . Cu
36, 46 . . . Ni, 56 . . . W
37, 47 . . . Ni, 57 . . . Cu, S
38, 48 . . . Ni, 58 . . . Ni, Cu, S
11 . . . Single-layer film
60 . . . Embedding resin
70 . . . Sliding surface
12 . . . Laminated film portion

The invention claimed is:

1. A laminate comprising:
a substrate; and
a laminated film portion with metal films laminated in two or more layers, wherein
the laminate has an interface layer between each two adjacent ones of the metal films, wherein only the interface layer contains S,
the laminated film portion contains a first metal element as a principal component, the first metal element is Ni and a second metal element is a metal element of smaller cohesive energy than that of the first metal element,
a concentration of the first metal element in the metal films is 90 at % or higher, and a concentration of the second metal element in the metal films is 1 at % or less,
the metals films contain at least one of P or B at a concentration in the metal films 3 at % or higher based on the concentration of the first metal element in the metal films, and
the second metal element contained in the interface layer is at a content ratio higher than that of the second metal element contained in each of the adjacent metal films.

2. The laminate according to claim 1, wherein the second metal element is at least one selected from Cu, Sn, Zn, Ag, Mn, Bi, In, and Sb.

3. The laminate according to claim 1, wherein the second metal element is nobler than a standard electrode potential of the metal films.

4. The laminate according to claim 1, wherein the second metal element is Cu.

5. The laminate according to claim 1, wherein the interface layer has a thickness of 100 nm or smaller.

6. The laminate according to claim 1, wherein the interface layer has a thickness of 10 nm or smaller.

7. The laminate according to claim 1, wherein the metal films are crystalline.

8. The laminate according to claim 7, wherein crystals precipitated in the metal films have a (100) orientation.

9. The laminate according to claim 7, wherein crystals precipitated in the metal films have a crystallite size of 10 nm or smaller.

10. The laminate according to claim 1, wherein the metal films have a thickness of 8 nm or greater but 500 nm or smaller.

11. The laminate according to claim 1, wherein a principal component of the substrate is copper.

12. A manufacturing process of the laminate according to claim 1, comprising:
a plurality of plating treatment steps of metal films; and
a plating treatment stopping step between each two successive ones of the plating treatment steps.

* * * * *